UNITED STATES PATENT OFFICE.

PEDRO RIVA, OF BUENOS AYRES, ARGENTINA.

PROCESS OF RETTING FLAX.

971,076. Specification of Letters Patent. Patented Sept. 27, 1910.

No Drawing. Application filed November 23, 1908. Serial No. 464,042.

*To all whom it may concern:*

Be it known that I, PEDRO RIVA, a subject of the King of Italy, and a resident of 343 B. Mitre street, Buenos Ayres, Argentina, have invented certain new and useful Improvements in Processes for Retting Flax, of which the following is a specification.

The present invention relates to a novel process for retting flax, which consists in extracting therefrom the vegetable fiber or cellulose by which process the preparation of the plants for the separation of the woody fibers and the elemination of the viscous matter lying immediately beneath the bark, that is to say, the substance which in the natural state of the plant binds the bark with the cellulose or vegetable fiber, is carried out in a combined way.

The most ancient process for retting flax consists in maintaining the plants, previously dried and tied up into smaller or larger bundles, in stagnant water, until a kind of putrefaction sets in which gradually destroys the glutinous matter. Another of the rural methods of retting flax is carried out by spraying the same; in accordance with this latter process the flax is extended on the ground and is left to the action of the atmosphere, and more or less frequently sprayed with water, according to the temperature of the season wherein said operation is effected. These two methods of retting flax require a very long time, and are besides unhealthy, on account of the gases developed by putrefaction which infect the water, or the emanations which vitiate the atmosphere.

In order to avoid the above drawbacks, after many experiments made for retting flax with chemical substances (such as products of potash and sulfur), a method of retting by means of hot water has been adopted, which method was first introduced into Ireland by Schenck, while Watt and Buchanan invented the method of retting flax by means of boiling water.

The novel process which forms the subject matter of the present invention is superior to all other known methods, and its object is to shorten to a considerable degree the time required for this operation, and to render the resulting fiber more tenacious and flexible and more susceptible of being bleached.

The retting process in accordance with my invention is carried out in the following way:—The flax previously dried is subjected to the action with or without pressure of a sufficient volume of sulfurous water of a smaller or larger percentage of sulfur, according to the quality of the flax to be treated. I use water containing one fourth to one per cent. of sulfuric acid. It is then allowed to stand long enough to allow the sulfurous water to properly act upon the flax. The acidulated water is allowed to stand long enough to properly act upon the flax and is then removed and the flax is subjected to the action of a vacuum, the object of which is to open the flax and extract as far as possible the acidulated water or moisture. Afterward the flax is subjected to the action with or without pressure of a sufficient volume of lye of soda or potash, which is again allowed to stand long enough to permit of the lye properly acting upon the flax. The lye is then removed and the flax again subjected to the action of a vacuum which finishes the opening up of the flax. When this has taken place, the flax is finally subjected to the action of steam under pressure of different atmospheres, the object being to thoroughly cleanse the flax from the substances with which it has been treated and other foreign matter. The steam treatment may last about half an hour, the pressure being 4 to 6 atmospheres. This last step completes my process.

What I claim is:—

A process for retting flax, consisting in subjecting the flax to the action of sulfurous water, then drawing off the water, then subjecting the flax to a vacuum, and finally subjecting the flax to the action of steam under pressure.

PEDRO RIVA.

Witnesses:
ROBERT GROSS,
OSCAR SCHNAITT.